United States Patent
Kaneichi (10) Patent No.: US 12,271,931 B2
(45) Date of Patent: Apr. 8, 2025

(54) CONTROL APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventor: Daiki Kaneichi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 17/650,679

(22) Filed: Feb. 11, 2022

(65) Prior Publication Data
US 2022/0261865 A1 Aug. 18, 2022

(30) Foreign Application Priority Data
Feb. 18, 2021 (JP) ................................. 2021-024531

(51) Int. Cl.
G06Q 30/04 (2012.01)
B60L 53/10 (2019.01)

(52) U.S. Cl.
CPC .............. *G06Q 30/04* (2013.01); *B60L 53/10* (2019.02)

(58) Field of Classification Search
CPC .................. G06Q 30/04; B60L 53/10
See application file for complete search history.

(56) References Cited

U.S. PATENT DOCUMENTS

| | | | | |
|---|---|---|---|---|
| 8,831,803 B2* | 9/2014 | Yamamoto | ........ | B60W 50/0097 701/103 |
| 10,553,040 B2* | 2/2020 | Lei | .......... | G07C 5/008 |
| 2012/0112698 A1* | 5/2012 | Yoshimura | ............. | G06Q 30/06 320/109 |
| 2019/0087753 A1* | 3/2019 | Ito | .......... | G06Q 50/40 |
| 2019/0299794 A1* | 10/2019 | Sworski | ................ | B60L 53/665 |
| 2019/0386502 A1* | 12/2019 | Penilla | ..................... | B60L 53/66 |
| 2022/0140610 A1* | 5/2022 | Bangalore | ............... | H02J 7/342 320/101 |
| 2023/0011596 A1* | 1/2023 | Kato | ....................... | B60L 53/53 |

FOREIGN PATENT DOCUMENTS

| | | |
|---|---|---|
| CN | 102473262 A | 5/2012 |
| JP | 2013073482 A | 4/2013 |
| JP | 2019169113 A | 10/2019 |
| JP | 2020086911 A | 6/2020 |

OTHER PUBLICATIONS

Qin, Helen, Powertrain Technology and Cost Assessment of Battery Electric Vehicles, University of Ontario Institute of Technology, Oshawa, Ontario, Canada, 2010.*

* cited by examiner

*Primary Examiner* — Nathan Erb
(74) *Attorney, Agent, or Firm* — Dickinson Wright, PLLC (57) ABSTRACT

A control apparatus includes a controller configured to: acquire energy information indicating a method of generating power that is stored in a battery of a vehicle; determine a usage fee for the vehicle based on the acquired energy information; and notify a user of the usage fee for the vehicle.

15 Claims, 3 Drawing Sheets

| METHOD OF GENERATING POWER | ELECTRICAL ENERGY (kWh) | ORIGIN OF POWER GENERATION |
|---|---|---|
| FIRST METHOD OF GENERATING POWER | 60 | HYDROELECTRIC POWER PLANT IN PREFECTURE A |
| SECOND METHOD OF GENERATING POWER | 40 | THERMAL POWER PLANT IN PREFECTURE B |
| ⋮ | ⋮ | ⋮ |

CONTROL APPARATUS, METHOD, AND NON-TRANSITORY COMPUTER READABLE MEDIUM

CROSS-REFERENCE TO RELATED APPLICATION

This application claims priority to Japanese Patent Application No. 2021-024531, filed on Feb. 18, 2021, the entire contents of which are incorporated herein by reference.

TECHNICAL FIELD

The present disclosure relates to a control apparatus, a method, and a program.

BACKGROUND

Technologies for using information relating to charging of vehicles are known. For example, Patent Document 1 discloses recording of information relating to recharging of a shared Battery Electric Vehicle (BEV) performed by a user during a borrowing period of the shared BEV in a car sharing service, and determination of compensation to be given to the user based on the information.

CITATION LIST

Patent Literature

PTL 1: JP 2019-169113 A

SUMMARY

The types of methods of generating power that has been charged to a vehicle have not been considered, and there is room for improvement in technologies that use information relating to charging of the vehicle.

It would be helpful to improve technologies that use information relating to charging of vehicles.

A control apparatus according to an embodiment of the present disclosure includes a controller configured to:
  acquire energy information indicating a method of generating power that is stored in a battery of a vehicle;
  determine a usage fee for the vehicle based on the acquired energy information; and
  notify a user of the usage fee for the vehicle.

A method according to an embodiment of the present disclosure includes:
  acquiring energy information indicating a method of generating power that is stored in a battery of a vehicle;
  determining a usage fee for the vehicle based on the acquired energy information; and
  notifying a user of the usage fee for the vehicle.

A program according to an embodiment of the present disclosure causes a computer to execute operations, the operations comprising:
  acquiring energy information indicating a method of generating power that is stored in a battery of a vehicle;
  determining a usage fee for the vehicle based on the acquired energy information; and
  notifying a user of the usage fee for the vehicle.

According to an embodiment of the present disclosure, technologies that use information relating to charging of vehicles are improved.

BRIEF DESCRIPTION OF THE DRAWINGS

In the accompanying drawings.

DETAILED DESCRIPTION

Hereinafter, an embodiment of the present disclosure will be described.

An outline of a system 1 according to an embodiment of the present disclosure will be described with reference to FIG. 1. The system 1 includes a vehicle 10 and a control apparatus 20. The vehicle 10 and the control apparatus 20 are communicably connected to a network 30 that includes, for example, the Internet, a mobile communication network, or the like.

The vehicle 10 is an automobile, for example, but not limited to this, and may be any vehicle that runs on charged power. The automobile is, for example, a battery electric vehicle (BEV), a hybrid electric vehicle (HEV), a plug-in hybrid electric vehicle (PHEV) or the like, but is not limited to these. The number of vehicles 10 provided in the system 1 may be freely determined.

The control apparatus 20 is, for example, a computer such as a server apparatus. The control apparatus 20 can communicate with the vehicle 10 via the network 30.

In the present embodiment, the system 1 is used for a car-sharing service in which a plurality of users shares the vehicle 10. For each of the users, a fee corresponding to use of the vehicle 10 is incurred. The fee may include a basic fee and a metered charge.

First, an outline of the present embodiment will be described, and details thereof will be described later. The control apparatus 20 acquires energy information indicating a method of generating power that is stored in a battery 14 of the vehicle 10. The control apparatus 20 determines a usage fee for the vehicle 10 based on the acquired energy information. The control apparatus 20 then notifies the user of the usage fee for the vehicle 10.

There may be a plurality of methods of generating power that are included in the energy information. In this case, the energy information indicates an amount of power for each of the plurality of methods of generating power. The energy information may be generated when the battery 14 is charged.

In this way, according to the present embodiment, the usage fee for the vehicle 10 is determined according to the method of generating power that is stored in the battery 14. Therefore, for example, it is possible to promote the use of desired energy resources. In addition, the user's awareness of energy resources can be increased through the usage fee for the vehicle 10. Therefore, the type of the method of generating power that has been charged to the vehicle is considered, and technology that uses information relating to the charging of vehicle can be improved.

Next, a configuration of the system 1 will be described in detail.

Figure 1:
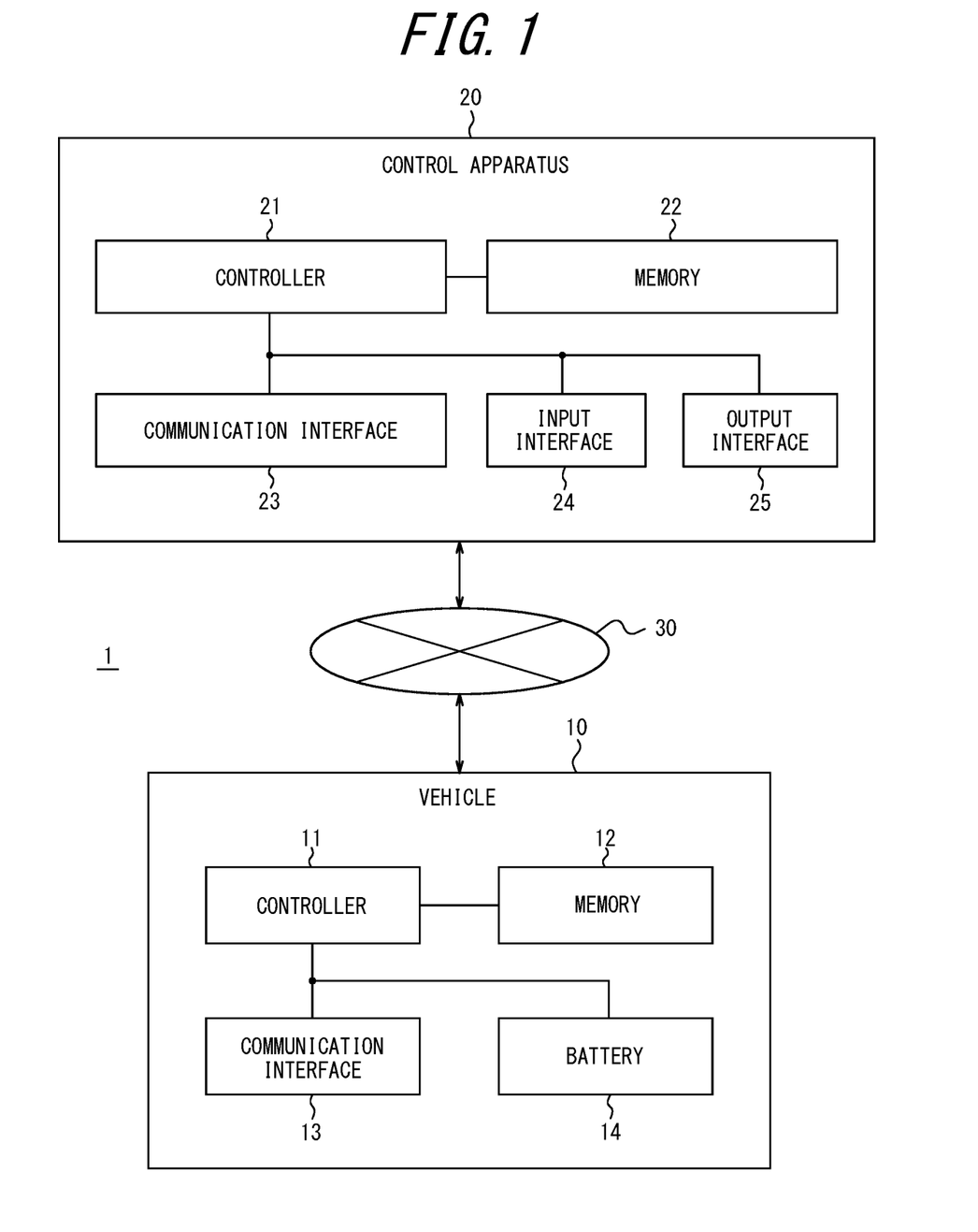
FIG. 1 is a block diagram illustrating a schematic configuration of a system according to an embodiment of the present disclosure.

As illustrated in FIG. 1, the vehicle 10 includes a communication interface 11, a memory 12, a communication interface 13, and the battery 14. The controller 11, the memory 12, the communication interface 13, and the battery 14 may be communicably connected to the in-vehicle network, such as a Controller Area Network (CAN).

The controller 11 includes at least one processor, at least one programmable circuit, at least one dedicated circuit, or a combination of these. The processor is a general-purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 11 controls operation of the entire vehicle 10. The controller 11 can acquire information indicating electrical energy that has been consumed from the battery 14, which is the total electrical energy that is consumed from a point in time at which the user started boarding. The controller 11 can acquire information indicating a state of charge from the battery 14.

The memory 12 includes one or more memories. The memories are semiconductor memories, magnetic memories, optical memories, or the like, for example, but are not limited to these. The memories included in the memory 12 may each function as, for example, a main memory, an auxiliary memory, or a cache memory. The memory 12 stores any data used for operation of the vehicle 10. For example, the memory 12 may store a system program, an application program, embedded software, and the like. The information stored in the memory 12 can be updated with, for example, information acquired from the network 30 via the communication interface 13. The memory 12 stores energy information.

The communication interface 13 includes at least one interface for communication. The interface for communication is, for example, an interface compliant with a mobile communication standard such as LTE, the 4G standard, or the 5G standard. For example, an in-vehicle communication device such as a DCM (Data Communication Module) may function as the communication interface 13. The communication interface 13 receives information to be used for the operation of the vehicle 10 and transmits information obtained by the operation of the vehicle 10. In the present embodiment, the vehicle 10 communicates with the control apparatus 20 via the communication interface 13 and the network 30.

The battery 14 is a secondary cell that can be repeatedly charged and discharged. The vehicle 10 is driven by supplying power from the battery 14 to a motor or the like. The battery 14 may be, for example, a lead-acid battery, a lithium-ion battery, a nickel-metal hydride battery, or the like. The battery 14 is, in a wired or wireless manner, connected to and charged by a charging device installed at any charging base, such as a parking lot provided by a car-sharing service or a user's home.

As illustrated in FIG. 1, the control apparatus 20 includes a controller 21, a memory 22, a communication interface 23, an input interface 24, and an output interface 25.

The controller 21 includes at least one processor, at least one programmable circuit, at least one dedicated circuit, or a combination of these. The processor is a general-purpose processor such as a CPU or a GPU, or a dedicated processor that is dedicated to specific processing, for example, but is not limited to these. The dedicated circuit is an ASIC, for example, but is not limited to this. The controller 21 controls operation of the entire control apparatus 20.

The memory 22 includes one or more memories. The memories included in the memory 22 may each function as, for example, a main memory, an auxiliary memory, or a cache memory. The memory 22 stores any information used for operation of the control apparatus 20. For example, the memory 22 may store a system program, an application program, a database, map information, and the like. The information stored in the memory 22 can be updated with, for example, information acquired from the network 30 via the communication interface 23.

The communication interface 23 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards. In the present embodiment, the control apparatus 20 communicates with the vehicle 10 via the communication interface 23 and the network 30.

The input interface 24 includes at least one interface for input. The interface for input is, for example, a physical key, a capacitive key, a pointing device, a touch screen integrally provided with a display, or a microphone. The input interface 24 accepts an operation for inputting data to be used for operation of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data acquired by the operations of the control apparatus 20. The output interface 25, instead of being included in the control apparatus 20, may be connected to the control apparatus 20 as an external output device. As the connection method, any technology such as USB, HDMI® (HDMI is a registered trademark in Japan, other countries, or both), or Bluetooth® (Bluetooth is a registered trademark in Japan, other countries, or both) can be used.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. Examples of the non-transitory computer readable medium include a magnetic recording device, an optical disk, a magneto-optical storage device, and ROM. The program is distributed, for example, by sale, transfer of ownership, or rental of a portable medium, such as a DVD or a CD-ROM, in which the program is stored. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit corresponding to the controller 21. That is, some or all of the functions of the control apparatus 20 may be realized by hardware.

Figure 2:
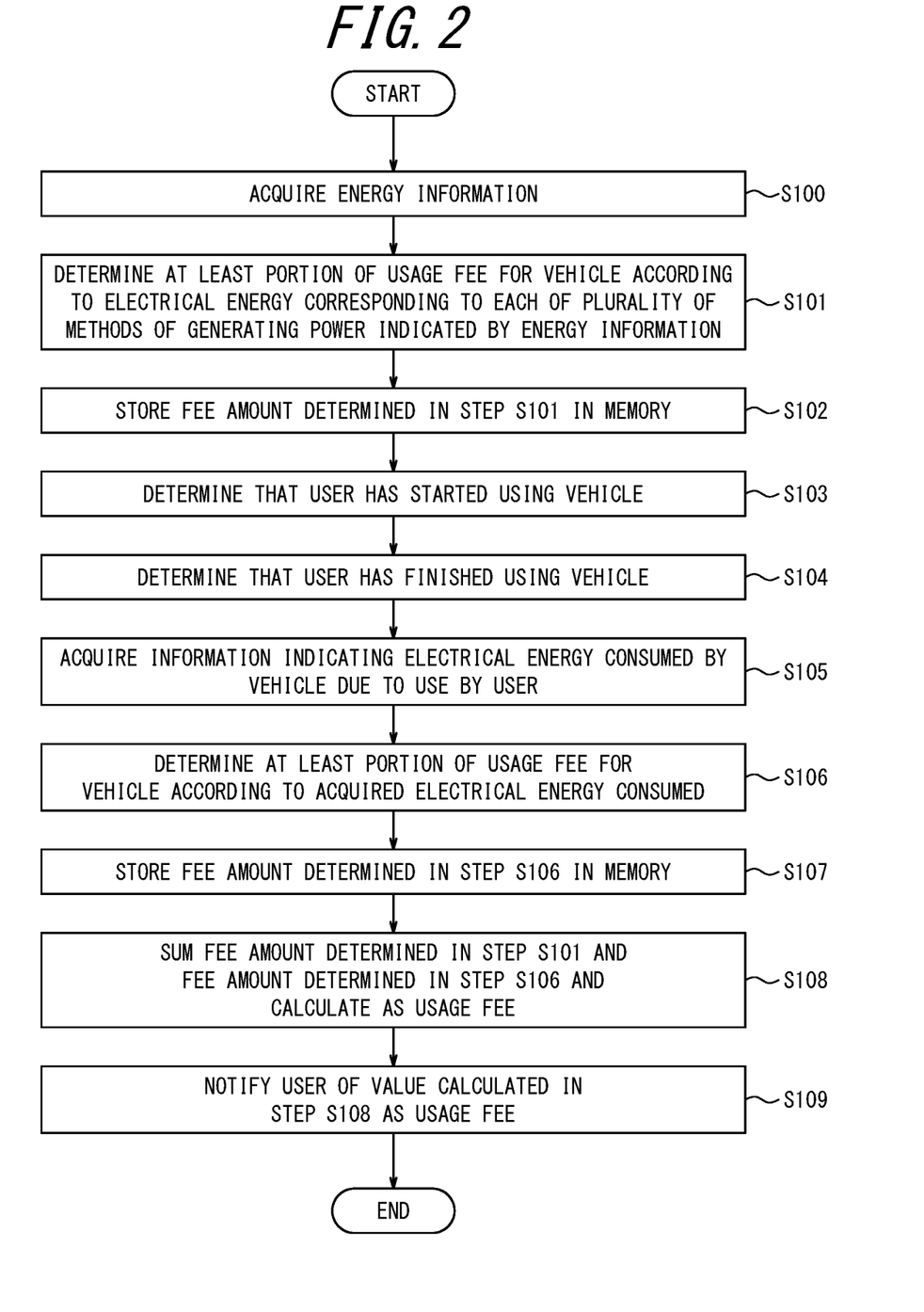
FIG. 2 is a flowchart illustrating operations of the control apparatus.

Operations of the control apparatus 20 according to the present embodiment will be described with reference to FIGS. 2 and 3. In the following, the control apparatus 20 transmits and receives information to and from external devices via the communication interface 23 and the network 30.

In step S100, the controller 21 of the control apparatus 20 acquires energy information indicating the method of generating power that is stored in the battery 14 of the vehicle 10.

Any method can be employed to acquire the energy information. For example, the controller 21 communicates with the vehicle 10, and acquires the energy information. Specifically, the controller 21 first requests the vehicle 10 to transmit the energy information. In response to the request, the controller 11 of the vehicle 10 transmits the energy information that is stored in the memory 12 to the control apparatus 20. The controller 21 acquires the energy information by receiving the information. The energy information may be periodically transmitted from the vehicle 10 to the control apparatus 20. Without being limited to this, the controller 21 may acquire the energy information from an external server that manages charging to the vehicle 10.

Figure 3:
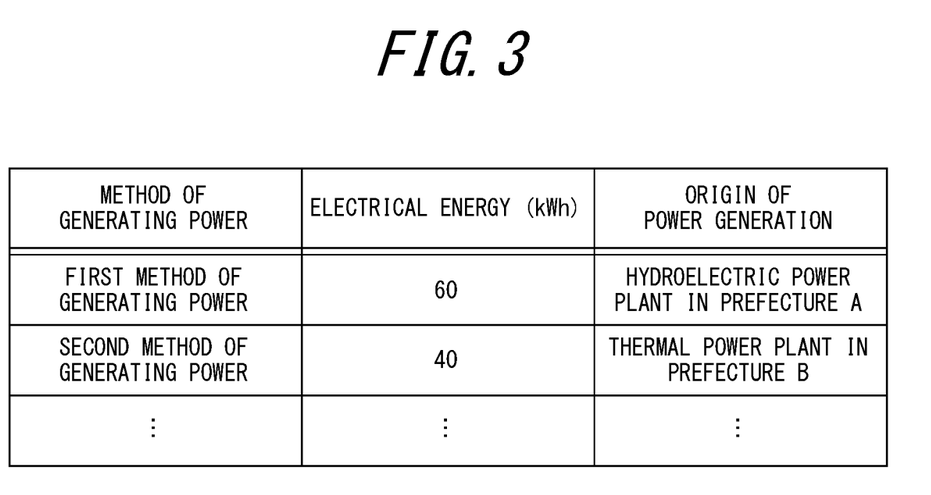
FIG. 3 is a diagram illustrating an example of energy information.

FIG. 3 shows an example of energy information in tabular form. The electrical energy, the method of generating power, and an origin of power generation are stored in the memory 12 of the vehicle 10 in association with each other as the energy information. The "electrical energy" is the electrical energy that is stored in the battery 14 of the vehicle 10, and has units of kWh. The electrical energy is indicated for each of the plurality of methods of generating power. The "method of generating power" is information indicating the method employed to generate the power stored in the battery 14, and includes a first method of generating power based on renewable resources and the second method of generating power based on non-renewable resources. The first method of generating power specifically includes solar power generation, wind power generation, hydroelectric power generation, geothermal power generation, solar thermal power generation, biomass power generation, and the like. The second method of generating power specifically includes oil power generation, coal power generation, natural gas power generation, and nuclear power generation, and the like. The "origin of power generation" is information that indicates a location where the electricity was generated.

The information included by the energy information is not limited to these, and, for example, information on a location where the vehicle 10 was charged, a price per unit of electrical energy corresponding to each of the plurality of methods of generating power, and the like, may also be recorded.

In step S101, the controller 21 determines at least a portion of the usage fee for the vehicle 10 according to the electrical energy corresponding to each of the plurality of methods of generating power indicated by the energy information acquired in step S100.

Specifically, the controller 21 determines at least a portion of the usage fee based on a result of multiplying the electrical energy corresponding to each of the plurality of methods of generating power by a price per unit of electrical energy corresponding to each of the plurality of methods of generating power. The "at least a portion of the usage fee" in this step corresponds to a basic fee for using the vehicle 10. The basic fee may be presented before a user uses the vehicle 10. The "price per unit of electrical energy" in this step may be the fee amount per kWh when electricity was supplied to the vehicle 10. The information on the price per unit of electrical energy may be included in the energy information, or the controller 21 may communicate with an external server to acquire the information on the price per unit of electrical energy.

In this example, the price per unit of electrical energy corresponding to the first method of generating power is 50 yen, and the price per unit of electrical energy corresponding to the second method of generating power is 60 yen. Referring to the energy information illustrated in FIG. 3, the electrical energy corresponding to the first method of generating power is 60 kWh and the electrical energy corresponding to the second method of generating power is 40 kWh. Based on these figures, the controller 21 calculates the amount of electricity of the first method of generating power as 3000 yen (50 yen×60 kWh) and the electrical energy of the second method of generating power as 2400 yen (60 yen×40 kWh). The controller 21 determines the sum of these calculated values, 5400 yen, as at least a portion of the usage fee for the vehicle 10.

The method of determining at least a portion of the usage fee is not limited to the methods described above. For example, the controller 21 may determine at least a portion of the usage fee based on a ratio of the electrical energy corresponding to each of the plurality of methods of generating power. Referring to the energy information illustrated in FIG. 3, the electrical energy corresponding to the first method of generating power is 60 kWh and the electrical energy corresponding to the second method of generating power is 40 kWh. Based on these figures, the controller 21 determines that the ratio between the first electrical energy, which is the electrical energy corresponding to the first method of generating power, and the second electrical energy, which is the electrical energy corresponding to the second method of generating power, is 3:2. The controller 21 sets a weighting factor according to the ratio. The weighting factor may be freely set, and, for example, the larger the ratio of the first electrical energy to the entire electrical energy, the smaller the weighting factor for the first electrical energy may be set. For example, suppose that the controller 21 sets the weighting factor for the first electrical energy to 0.5 and the weighting factor for the second electrical energy to 1.2. In this case, the controller 21 multiplies each of the ratios by the corresponding weighting factor, and calculates a value of 1.5 (3×0.5) for the first electrical energy and a value of 2.4 (2×1.2) for the second electrical energy. The controller 21 multiplies the value of 3.9, that is the total of the calculated values, by a fixed amount of 1,000 yen to calculate the fee amount of 3,900 yen. The controller 21 may determine the calculated 3900 yen as at least a portion of the usage fee for the vehicle 10.

In step S102, the controller 21 stores the fee amount determined in step S101 in the memory 22. In this example, the controller 21 stores the value of 5400 yen in the memory 22.

In step S103, the controller 21 determines that the user has started using the vehicle 10.

Any method may be employed to determine that the user has started using the vehicle 10. For example, the controller 21 may acquire positional information for the vehicle 10 and positional information for a terminal apparatus held by the user, and determine, from the positional information, that the user has boarded and started using the vehicle 10.

In step S104, the controller 21 determines that the user has finished using the vehicle 10.

Any method may be employed to determine that the user has finished using the vehicle 10. For example, when the controller 21 receives a notification from the terminal apparatus held by the user that the user has finished using the vehicle 10, the controller 21 may determine that the user has alighted from the vehicle 10 and finished using the vehicle.

In step S105, the controller 21 acquires information indicating the electrical energy consumed by the vehicle 10 due to use by the user.

Any method may be used to acquire the information indicating the electrical energy consumed. For example, the controller 21 may communicate with a power sensor that measures the electrical energy consumed, and acquire the measurement result measured by the power sensor as information indicating the electrical energy consumed. In this example, the electrical energy consumed in the vehicle 10 due to use by the user is 70 kWh.

In step S106, the controller 21 determines at least a portion of the usage fee for the vehicle 10 according to the acquired electrical energy consumed.

The controller 21 determines a value calculated by multiplying the electrical energy consumed that is acquired by any of the prices per unit of electrical energy corresponding respectively to the plurality of methods of generating power, as the at least the portion of the usage fee. The "at least the portion of the usage fee" in this step corresponds to a metered charge that is incurred according to the amount of use of the vehicle 10. The "price per unit of electrical energy" in this step may be the fee amount of electrical energy per kWh when the user uses the vehicle 10. The controller 21 may communicate with the external server to acquire the information on the price per unit of electrical energy while the user is using the vehicle 10 or when the user finished using the vehicle 10.

Specifically, the controller 21 determines a value calculated as X×C as the at least a portion of the usage fee if $0 < C \leq A$, where A is the first electrical energy corresponding to the first method of generating power, B is the second electrical energy corresponding to the second method of generating power, C is the electrical energy consumed due to use by the user, X is a price per unit of electrical energy corresponding to the first method of generating power, and Y is a price per unit of electrical energy corresponding to the second method of generating power. If $A < C \leq (A+B)$, the controller 21 determines the value calculated as X×A+Y× (C−A) as the at least a portion of the usage fee. In this example, A=60 kWh, B=40 kWh, C=70 kWh, and A+B=100 kWh. Further, X=30 yen and Y=40 yen. Since $A < C \leq (A+B)$, the controller 21 determines a value of 2200 yen calculated by the formula X×A+Y×(C−A) as the metered charge.

In step S107, the controller 21 stores the fee amount determined in step S106 in the memory 22. In this example, the controller 21 stores the value of 2200 yen in the memory 22.

In step S108, the controller 21 sums the fee amount determined in step S101, that is the basic fee as the part of the usage fee, and the fee amount determined in step S106, that is the metered charge as the part of the usage fee, and calculates it as the usage fee. In this example, the controller 21 totals the value of 5400 yen determined in step S101 and the value of 2200 yen determined in step S106, to calculate a value of 7600 yen.

In step S109, the controller 21 notifies the user of the value calculated in step S108 as a usage fee. The process then ends.

Any method may be employed to notify the user of the usage fee. For example, the controller 21 may transmit information indicating the usage fee to the terminal apparatus held by the user. In this case, the terminal apparatus receives the information and notifies the user of the usage fee in the form of an image or a sound. In the notification of usage fee, the fee amount incurred according to electrical energy of each of the first method of generating power and the second method of generating power, may be separately notified. In the notification of usage fee, the basic fee and the metered charge may be separately notified.

The process is not limited to the above, and the controller 21 may perform just one of the process of determining the basic fee in step S101 and the process of determining the metered charge in steps S105 to S108.

As described above, the control apparatus 20 according to the present embodiment includes a controller 21 configured to: acquire energy information indicating a method of generating power that is stored in a battery 14 of a vehicle 10; determine a usage fee for the vehicle 10 based on the acquired energy information; and notify a user of the usage fee for the vehicle 10.

The usage fee for the vehicle 10 is determined according to the method of generating power that is stored in the battery 14. Thus, the user who intends to use the vehicle 10 can easily be aware of the generation method for the power. Accordingly, technology for using information relating to charging of the vehicle can be improved.

As described above, the energy information indicates an amount of the power for each of a plurality of methods of generating power. The controller 21 is configured to determine at least a portion of the usage fee for the vehicle 10 according to the electrical energy corresponding to each of the plurality of methods of generating power.

The portion of the usage fee is determined according to the electrical energy corresponding to each of the plurality of methods of generating power. Thus, the user can easily be aware of the type of the generation method, and the corresponding electrical energy. In addition, a provider which provides a car sharing service can also flexibly determine the usage fee for the vehicle 10 to be provided. Accordingly, technology for using information relating to charging of the vehicle can be improved.

As described above, in the control apparatus 20, the controller 21 is configured to determine at least a portion of the usage fee based on a result of multiplying the electrical energy corresponding to each of the plurality of methods of generating power by a price per unit of electrical energy corresponding to each of the plurality of methods of generating power.

The portion of the usage fee is determined by multiplying the electrical energy by the price per unit of electrical energy corresponding to each of the plurality of methods of generating power. When choosing the vehicle 10, the user can easily be aware of the type of the method of generating power and the corresponding electrical energy, as the breakdown of the usage fee becomes clearer. Accordingly, technology for using information relating to charging of the vehicle can be improved.

As described above, in the control apparatus 20, the controller 21 is configured to determine at least a portion of the usage fee based on a ratio of the electrical energy corresponding to each of the plurality of methods of generating power.

The user who intends to use the vehicle 10 can easily be aware of the ratio of the electrical energy corresponding to each of the plurality of methods of generating power out of the total electrical energy that is stored in the battery 14. In addition, the provider which provides the car sharing service can also flexibly determine the usage fee for the vehicle 10 using the ratio of the electrical energy. Accordingly, technology for using information relating to charging of the vehicle can be improved.

As described above, in the control apparatus 20, the plurality of methods of generating power includes a first method of generating power based on renewable resources and a second method of generating power based on non-renewable resources. The controller 21 is configured to determine a value calculated as $X \times C$ as the at least a portion of the usage fee if $0<C \leq A$, and determine a value calculated as $X \times A + Y \times (C-A)$ as the at least a portion of the usage fee if $A<C \leq (A+B)$, where A is a first electrical energy corresponding to the first method of generating power, B is a second electrical energy corresponding to the second method of generating power, C is an electrical energy consumed due to use by the user, X is a price per unit of electrical energy corresponding to the first method of generating power, and Y is a price per unit of electrical energy corresponding to the second method of generating power.

The metered charge as a part of the usage fee is determined according to whichever of the power from a renewable resource or the power from a non-renewable resource was used. In this manner, the user who intends to use the vehicle 10 can more easily be aware of whether the power stored in the battery 14 is from a renewable resource or a non-renewable resource. Accordingly, technology for using information relating to charging of the vehicle can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided. For example, an embodiment in which the configuration and operations of the control apparatus 20 in the above embodiment are distributed to a plurality of computers capable of communicating with each other is also possible. For example, an embodiment in which some or all of the components of the control apparatus 20 are provided in the vehicle 10 is also possible.

(Variation 1)

As a variation of the present disclosure, the controller 21 may be configured to determine a value as at least a portion of the usage fee by multiplying a value obtained by subtracting the electrical energy corresponding to a predetermined method of generating power among the plurality of methods of generating power from an electrical energy consumed in the vehicle 10 due to use by the user, by any of the prices per unit of electrical energy corresponding to the plurality of methods of generating power.

Specifically, the controller 21 first acquires information indicating the electrical energy consumed. The controller 21 selects a predetermined method of generating power among the plurality of methods of generating power, and calculates a value by subtracting the electrical energy corresponding to the selected method of generating power from the electrical energy consumed. The controller 21 determines a metered charge as at least a portion of the usage fee, based on a result of multiplying the electrical energy calculated by a price per unit of the electrical energy. The price per unit of the electrical energy may be the price when the vehicle 10 is used.

For example, suppose the acquired electrical energy consumed is 50 kWh, and the first electrical energy corresponding to the first method of generating power and the second electrical energy corresponding to the second method of generating power that are stored in the battery 14, are 40 kWh and 30 kWh, respectively. The controller 21 selects the first electrical energy among the first electrical energy and the second electrical energy. The controller 21 calculates a value of 10 kWh, which is the result of subtracting 40 kWh of the first electrical energy from 50 kWh of the electrical energy consumed. The controller 21 multiplies the calculated first electrical energy of 10 kWh by the price per unit of electrical energy corresponding to the first method of generating power of 50 yen, to calculate a value of 500 yen. The controller 21 determines the calculated value of 500 yen as the metered charge.

According to this variation, for the user, a fee in accordance with the electrical energy consumed is not incurred up to an amount corresponding to any method of generating power out of the plurality of methods of generating power. The user selects the vehicle 10, taking into account the time or distance for which the vehicle 10 is planned to be used, and being aware of the method of generating power that is charged. In addition, the car-sharing service provider can flexibly determine services. Thus, technology for using information relating to charging of the vehicle can be improved.

(Variation 2)

As a variation of the present disclosure, the controller 21 is configured to: acquire information indicating regenerated electrical energy generated during use of the vehicle; and add a value of the regenerated electrical energy to any value of the electrical energies corresponding to the plurality of methods of generating power based on the information, when determining the at least a portion of the usage fee.

Specifically, the controller 21 first acquires information indicating electrical energy consumed and the regenerated electrical energy. Regenerated electrical energy refers to electrical energy generated by regenerative braking during use of the vehicle 10. Any method may be used to acquire the information indicating the regenerated electrical energy. For example, the controller 21 may communicate with a power sensor that measures the regenerated electrical energy, and acquire the measurement result by the power sensor as information indicating the regenerated electrical energy.

Next, the controller 21 selects any method of generating power among the plurality of methods of generating power, and adds the value of the regenerated electrical energy to the value of the electrical energy corresponding to the selected method of generating power. The controller 21 determines a value calculated as Q×F as the at least the portion of the usage fee if 0<F≤D, where D is the electrical energy resulting from addition, E is the electrical energy corresponding to the unselected method of generating power, F is the electrical energy consumed due to use by the user, Q is the price per unit of electrical energy corresponding to the selected method of generating power, and R is the price per unit of electrical energy corresponding to the non-selected method of generating power. If D<F≤(D+E), the controller 21 determines the value calculated as Q×D+R×(F−D) as the at least a portion of the usage fee. The price per unit of electrical energy may be the fee amount of electrical energy per kWh at the point of time at which the user uses the vehicle 10.

For example, suppose that the regenerated electrical energy is 10 kWh and that the methods of generating power for the electrical energy stored in the battery 14 are the first method of generating power and the second method of generating power, and among the electrical energy, the controller 21 selects the first electrical energy corresponding to the first method of generating power. Also, assume that the first electrical energy is 50 kWh. The controller 21 adds the value of 10 kWh of regenerated electrical energy to the value of the selected first electrical energy to calculate the value of D=60 kWh. Suppose also that the electrical energy consumed F=50 kWh, the second electrical energy E=40 kWh, the price per unit of electrical energy corresponding to the first method of generating power as Q=30 yen, and the price per unit of electrical energy corresponding to the second method of generating power R=40 yen. Since 0<F≤D, the controller 21 determines a value of 1,500 yen, which is calculated by the formula Q×F, as the metered charge.

According to this variation, the controller 21 regards the regenerated electrical energy as the electrical energy corresponding to the selected method of generating power to calculate, and determines a portion of the usage fee. If the electrical energy consumed is less than or equal to the sum of the electrical energy corresponding to any of the plurality of methods of generating power and the regenerated electrical energy, the metered charge is determined by multiplying the price per unit of electrical energy corresponding to the method of generating power by the electrical energy consumed. The user is more aware of the type of the method of generating power, because it becomes clear which method of generating power the regenerated electrical energy is regarded and calculated as. In addition, the car-sharing service provider can flexibly determine services. Thus, technology for using information relating to charging of the vehicle can be improved.

The invention claimed is:

1. A control apparatus comprising
a communication interface configured to communicate with a terminal apparatus of a user and a vehicle via a network; and
a controller configured to:
acquire energy information indicating a method of generating power that is stored in a battery of the vehicle from the vehicle via the communication interface;
determine a usage fee for the vehicle based on the acquired energy information; and
notify the user of the usage fee for the vehicle by transmitting information indicating the usage fee for the vehicle to the terminal apparatus via the communication interface,
wherein the energy information indicates an amount of the power for each of a plurality of methods of generating power, and the controller is further configured to:
determine at least a portion of the usage fee for the vehicle according to an electrical energy corresponding to each of the plurality of methods of generating power;
acquire, from a power sensor of the battery of the vehicle via the communication interface, information indicating regenerated electrical energy generated during use of the vehicle; and
add a value of the regenerated electrical energy to any value of the electrical energies corresponding to the plurality of methods of generating power based on the information, when determining the at least a portion of the usage fee;
wherein the usage fee is a fee paid by the user for use of a shared vehicle of a car-sharing service.

2. The control apparatus of claim 1, wherein the controller is further configured to determine the at least a portion of the usage fee based on a result of multiplying the electrical energy corresponding to each of the plurality of methods of generating power by a price per unit of electrical energy corresponding to each of the plurality of methods of generating power.

3. The control apparatus of claim 1, wherein the controller is further configured to determine the at least a portion of the usage fee based on a ratio of the electrical energy corresponding to each of the plurality of methods of generating power.

4. The control apparatus of claim 1, wherein the plurality of methods of generating power includes a first method of generating power based on renewable resources and a second method of generating power based on non-renewable resources, and the controller is further configured to:
determine a value calculated as X×C as the at least a portion of the usage fee if 0<C≤A; and
determine a value calculated as X×A+Y×(C−A) as the at least a portion of the usage fee if A<C≤(A+B), where A is a first electrical energy corresponding to the first method of generating power, B is a second electrical energy corresponding to the second method of generating power, C is an electrical energy consumed due to use by the user, X is a price per unit of electrical energy corresponding to the first method of generating power, and Y is a price per unit of electrical energy corresponding to the second method of generating power.

5. The control apparatus of claim 1, wherein the controller is further configured to determine a value as the at least a portion of the usage fee by: multiplying a value obtained by subtracting the electrical energy corresponding to a predetermined method of generating power among the plurality of methods of generating power from an electrical energy consumed in the vehicle due to use by the user, by any of the prices per unit of electrical energy corresponding to the plurality of methods of generating power.

6. A method implemented with a computer comprising:
performing, by the computer, steps comprising:
- acquiring energy information indicating a method of generating power that is stored in a battery of a vehicle from a vehicle via a communication interface configured to communicate with a terminal apparatus of a user and the vehicle via a network;
- determining a usage fee for the vehicle based on the acquired energy information; and
- notifying the user of the usage fee for the vehicle by transmitting information indicating the usage fee for the vehicle to the terminal apparatus via the communication interface,
- wherein the energy information indicates an amount of the power for each of a plurality of methods of generating power, the steps further comprising determining at least a portion of the usage fee for the vehicle according to an electrical energy corresponding to each of the plurality of methods of generating power,
- wherein the steps further comprise:
- acquiring, from a power sensor of the battery of the vehicle via the communication interface, information indicating regenerated electrical energy generated during use of the vehicle; and
- adding a value of the regenerated electrical energy to any value of the electrical energies corresponding to the plurality of methods of generating power based on the information, when determining the at least a portion of the usage fee;
- wherein the usage fee is a fee paid by the user for use of a shared vehicle of a car-sharing service.

7. The method of claim 6, further comprising determining the at least a portion of the usage fee based on a result of multiplying the electrical energy corresponding to each of the plurality of methods of generating power by a price per unit of electrical energy corresponding to each of the plurality of methods of generating power.

8. The method of claim 6, further comprising determining the at least a portion of the usage fee based on a ratio of the electrical energy corresponding to each of the plurality of methods of generating power.

9. The method of claim 6, wherein the plurality of methods of generating power includes a first method of generating power based on renewable resources and a second method of generating power based on non-renewable resources, and the method further comprises:
- determining a value calculated as $X \times C$ as the at least a portion of the usage fee if $0 < C \leq A$; and
- determining a value calculated as $X \times A + Y \times (C-A)$ as the at least a portion of the usage fee if $A < C \leq (A+B)$, where A is a first electrical energy corresponding to the first method of generating power, B is a second electrical energy corresponding to the second method of generating power, C is an electrical energy consumed due to use by the user, X is a price per unit of electrical energy corresponding to the first method of generating power, and Y is a price per unit of electrical energy corresponding to the second method of generating power.

10. The method of claim 6, wherein the steps further comprise determining a value as the at least a portion of the usage fee by: multiplying a value obtained by subtracting the electrical energy corresponding to a predetermined method of generating power among the plurality of methods of generating power from an electrical energy consumed in the vehicle due to use by the user, by any of the prices per unit of electrical energy corresponding to the plurality of methods of generating power.

11. A non-transitory computer-readable medium storing thereon a program configured to, upon execution by a computer cause the computer to execute operations, the operations comprising:
- acquiring energy information indicating a method of generating power that is stored in a battery of a vehicle from a vehicle via a communication interface configured to communicate with a terminal apparatus of a user and the vehicle via a network;
- determining a usage fee for the vehicle based on the acquired energy information; and
- notifying the user of the usage fee for the vehicle by transmitting information indicating the usage fee for the vehicle to the terminal apparatus via the communication interface,
- wherein the energy information indicates an amount of the power for each of a plurality of methods of generating power, the method further comprising determining at least a portion of the usage fee for the vehicle according to an electrical energy corresponding to each of the plurality of methods of generating power,
- wherein the operations further comprise:
- acquiring, from a power sensor of the battery of the vehicle via the communication interface, information indicating regenerated electrical energy generated during use of the vehicle; and
adding a value of the regenerated electrical energy to any value of the electrical energies corresponding to the plurality of methods of generating power based on the information, when determining the at least a portion of the usage fee;
- wherein the usage fee is a fee paid by the user for use of a shared vehicle of a car-sharing service.

12. The non-transitory computer-readable medium of claim 11, wherein the program causes the computer to execute operations further comprising determining the at least a portion of the usage fee based on a result of multiplying the electrical energy corresponding to each of the plurality of methods of generating power by a price per unit of electrical energy corresponding to each of the plurality of methods of generating power.

13. The non-transitory computer-readable medium of claim 11, wherein the program causes the computer to execute operations further comprising determining the at least a portion of the usage fee based on a ratio of the electrical energy corresponding to each of the plurality of methods of generating power.

14. The non-transitory computer-readable medium of claim 11, wherein the plurality of methods of generating power includes a first method of generating power based on renewable resources and a second method of generating power based on non-renewable resources, and the program causes the computer to execute operations further comprising:
- determining a value calculated as $X \times C$ as the at least a portion of the usage fee if $0 < C \leq A$; and
- determining a value calculated as $X \times A + Y \times (C-A)$ as the at least a portion of the usage fee if $A < C \leq (A+B)$, where A is a first electrical energy corresponding to the first method of generating power, B is a second electrical energy corresponding to the second method of generating power, C is an electrical energy consumed due to use by the user, X is a price per unit of electrical energy corresponding to the first method of generating power, and Y is a price per unit of electrical energy corresponding to the second method of generating power.

15. The non-transitory computer-readable medium of claim 11, wherein the program causes the computer to execute operations further comprising determining a value as the at least a portion of the usage fee by: multiplying a value obtained by subtracting the electrical energy corresponding to a predetermined method of generating power among the plurality of methods of generating power from an electrical energy consumed in the vehicle due to use by the user, by any of the prices per unit of electrical energy corresponding to the plurality of methods of generating power.

* * * * *